US009785606B2

(12) United States Patent
Wielicki et al.

(10) Patent No.: US 9,785,606 B2
(45) Date of Patent: Oct. 10, 2017

(54) SYSTEMS, METHODS, AND DEVICES FOR MEDIA AGNOSTIC USB PACKET SCHEDULING

(71) Applicants: Rafal Wielicki, Gdansk (PL); Marek Dabek, Gdansk (PL); Maciej Kurczewski, Gdansk (PL)

(72) Inventors: Rafal Wielicki, Gdansk (PL); Marek Dabek, Gdansk (PL); Maciej Kurczewski, Gdansk (PL)

(73) Assignee: Intel Corporation, Santa Clara, CA (US)

(*) Notice: Subject to any disclaimer, the term of this patent is extended or adjusted under 35 U.S.C. 154(b) by 225 days.

(21) Appl. No.: 14/579,451

(22) Filed: Dec. 22, 2014

(65) Prior Publication Data
US 2016/0179743 A1 Jun. 23, 2016

(51) Int. Cl.
H05K 7/10 (2006.01)
G06F 13/20 (2006.01)
H04L 12/28 (2006.01)
H04L 12/56 (2006.01)
G06F 13/42 (2006.01)
G06F 13/40 (2006.01)
G06F 13/38 (2006.01)

(52) U.S. Cl.
CPC ........ G06F 13/4282 (2013.01); G06F 13/385 (2013.01); G06F 13/4068 (2013.01)

(58) Field of Classification Search
CPC ..... H04L 45/00; H04L 47/2441; H04L 47/10; H04L 12/5695; H04L 47/2408; H04L 47/805; H04L 12/5693; G06F 9/30018; G06F 9/30021
USPC ................. 710/301, 313; 370/412
See application file for complete search history.

(56) References Cited

U.S. PATENT DOCUMENTS

| | | | | |
|---|---|---|---|---|
| 5,781,624 A * | 7/1998 | Mitra | ................. | H04L 12/5602 379/221.07 |
| 7,987,302 B2 * | 7/2011 | Diepstraten | ......... | H04L 47/6215 71/29 |
| 8,331,901 B2 * | 12/2012 | Raleigh | ............ | G06Q 10/06375 455/405 |
| 8,521,930 B1 * | 8/2013 | Meyers | ................... | G06F 13/22 710/107 |
| 8,971,345 B1 * | 3/2015 | McCanne | ........... | H04L 47/6215 370/412 |

(Continued)

Primary Examiner — Faisal M Zaman
(74) Attorney, Agent, or Firm — Eversheds Sutherlands (US) LLP

(57) ABSTRACT

Example systems, methods, and devices are disclosed for scheduling traffic by a media agnostic universal serial bus protocol adaptive layer. In one embodiment, a method can include determining, by a processor, a first bitmask including first binary information about a state of a plurality of universal serial bus traffic classes, selecting, by the processor, one or more universal serial bus traffic classes to service based at least in part on the first binary information, determining, by the processor, a second bitmask including second binary information about a state of a plurality of universal serial bus endpoint queues, each universal serial bus endpoint queue including a plurality of universal serial bus endpoints, and selecting, by the processor, one or more universal serial bus endpoint queues to service based at least in part on the second binary information.

24 Claims, 4 Drawing Sheets

(56) References Cited

U.S. PATENT DOCUMENTS

| | | | |
|---|---|---|---|
| 9,019,121 B1* | 4/2015 | Duff | G01D 4/002 340/13.23 |
| 2003/0079061 A1* | 4/2003 | Azzarito | G06F 13/385 710/5 |
| 2005/0289530 A1* | 12/2005 | Robison | G06F 8/445 717/159 |
| 2006/0092836 A1* | 5/2006 | Kwan | H04L 47/10 370/229 |
| 2007/0078997 A1* | 4/2007 | Stern | H04L 67/02 709/230 |
| 2007/0110034 A1* | 5/2007 | Bennett | H04L 45/00 370/352 |
| 2007/0147403 A1* | 6/2007 | Khanna | H04L 12/5693 370/412 |
| 2008/0165683 A1* | 7/2008 | Saha | H04L 45/00 370/231 |
| 2009/0198859 A1* | 8/2009 | Orishko | G06F 13/385 710/313 |
| 2011/0019669 A1* | 1/2011 | Ma | H04L 45/00 370/389 |
| 2013/0279327 A1* | 10/2013 | Lewin-Eytan | H04L 47/10 370/229 |
| 2015/0134864 A1* | 5/2015 | Foster | G06F 13/4286 710/106 |
| 2016/0217093 A1* | 7/2016 | Whittington | H04L 12/462 |

* cited by examiner

SYSTEMS, METHODS, AND DEVICES FOR MEDIA AGNOSTIC USB PACKET SCHEDULING

TECHNICAL FIELD

Embodiments described herein generally relate to packet scheduling in a media agnostic universal serial bus (MA-USB).

BACKGROUND

Recently, application services for transmitting various multimedia data at high speed have been widely used in wireless communication fields. In addition, the potential market for consumer electronic (CE) devices with these services has grown. Electronic devices, such as computers and other devices, often transmit signals to receiving stations such as displays or speakers. Such transmission often occurs via wires or cables. However, wireless transmission offers freedom from wires and cables. For interoperability among various manufacturers' products, these devices may communicate according to a standard, such as the WiFi Alliance (WFA), for example.

The Universal Serial Bus (USB) Protocol Adaptation Layer (PAL) is a technology that enables support of USB traffic over a medium other than USB. Specifically with the WiFi Alliance, the WiFi Serial Bus (WSB) provides USB PAL as a service for WiFi links, for example. On a wired USB, the user makes the decision of choosing and using a USB peripheral device by physically plugging it into the USB port on the USB host, e.g., by connecting a USB mouse to a personal computer (PC). In contrast, when used over a wireless medium, the user needs to rely on discovery mechanisms provided by lower layers, e.g., media access control (MAC) mechanisms provided in data link layer (layer 2), internet protocol (IP) mechanisms provided in network layer (layer 3), etc., to learn about USB PAL capable devices which are available for connection.

Media Agnostic USB (MA-USB) is a specification being developed by the USB Implementers Forum. It is intended to enable communication using the Universal Serial Bus (USB) protocol to be performed over a wide range of physical communication media, including WiFi and WiGig wireless networks. The protocol is being developed from the base of the Wi-Fi Alliance's previous WiGig Serial Extension (WSE) specification. Media Agnostic USB is distinct from, and should not be confused with, previous wireless USB protocols such as Certified Wireless USB. Essentially, it allows USB communications for wireless devices and docking stations without actually needing a USB port or physical connection. It enables wireless gigabit transfer rates using existing USB infrastructure, for example.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
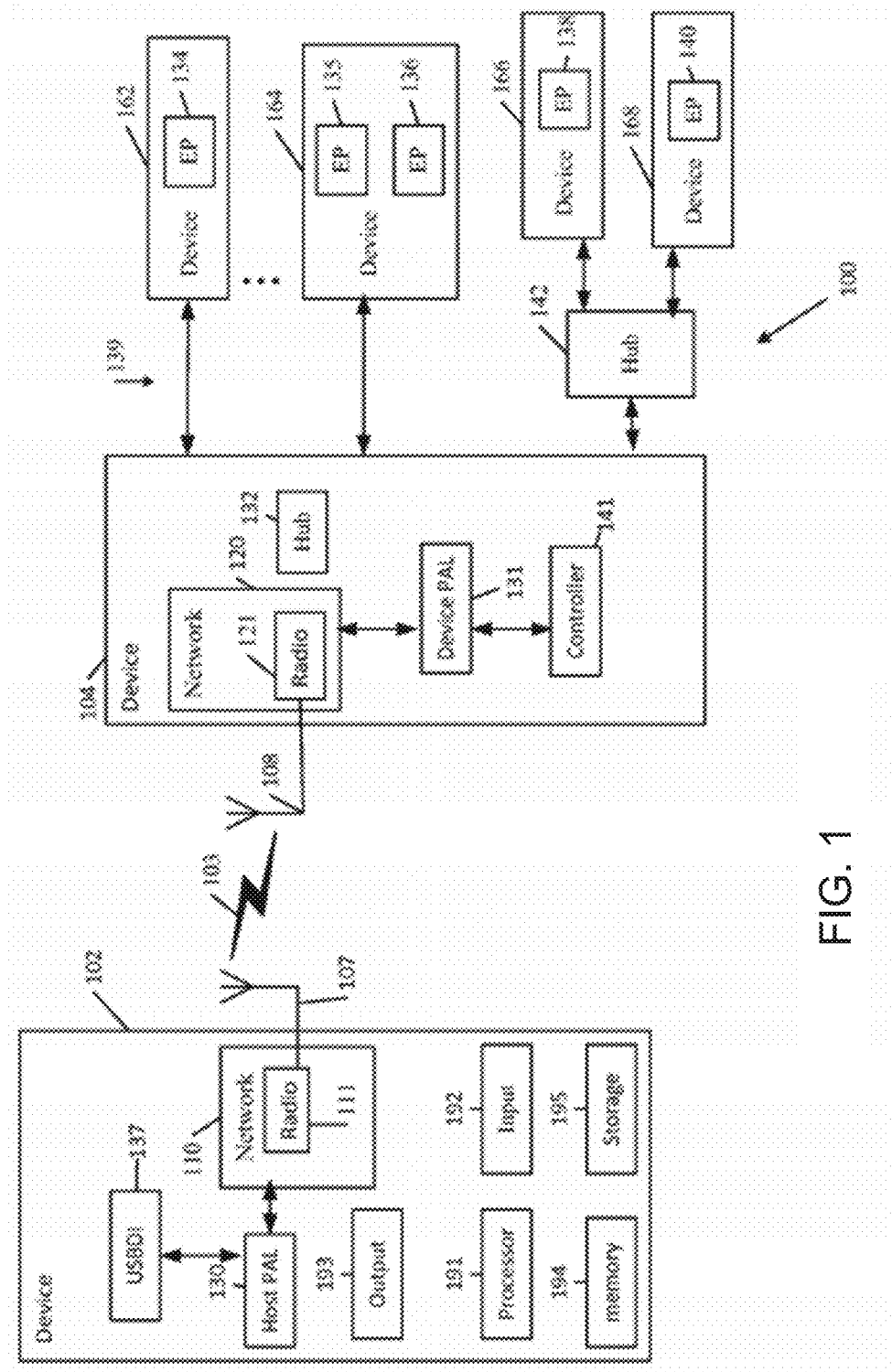
FIG. 1 is a schematic block diagram illustration of a system, in accordance with one or more example embodiments.

Media Agnostic USB (MA-USB) Protocol Adaptation Layer (PAL) is the technology that enables transport of USB data over media other than USB cable, for example, wireless links—Wi-Fi or WiGig links, or wired links like Ethernet. In case of wireless links, MA-USB PAL may interface directly with the radio, for example, replace the network layer in OSI model or be an IP application, interfacing with the IP (TCP/IP) stacks. Similar to wired USB, in MA-USB, there exist four USB traffic types that are assigned priorities of processing by core USB specification, for example. The first type is non-periodic Control (CTRL), the second type is periodic Isochronous (ISOCH), the third type is periodic Interrupt (INTR), and the fourth type is non-periodic Bulk (BULK). However, these priorities are merely examples and some implementations may treat these traffic types differently. For example, some implementations may decide to treat ISOCH as higher priority than CTRL. Each transfer type can be classified as OUT when the data travels in the host-to-device direction, and IN when the data travels in the device-to-host direction. The host MA-USB PAL which is the function on the host platform, for example, a media-agnostic USB host (MA-USB host) that performs the host functions specific to media agnostic USB should include per packet traffic scheduling component responsible for following priorities described above. The need for traffic scheduling is growing with the total throughput of a medium used to transport USB data and number of devices required to operate simultaneously. Existing media-agnostic solutions either do not explicitly address scheduling of transfer types or delegate it to the transport medium. Such approach is not sufficient for an effective high throughput solution that has to simultaneously service time sensitive ISOCH traffic with background BULK traffic as the time sensitive ISOCH traffic may get pre-empted by BULK causing user observable service degradation, for example, audio distortions or glitches. Examples of existing solutions that use USB traffic scheduling include open source projects like http://usbip-.sourceforge.net/ as well as other stacks for Wireless Docking (802.11ac/802.11ad based).

Example embodiments described herein provide certain systems, methods, and devices, for improved media agnostic USB packet scheduling. Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing WiFi Alliance specifications and/or future versions and/or derivatives thereof, devices and/or networks operating in accordance with existing WiGig Serial Extension (WSE) protocols and/or future versions and/or derivatives thereof, devices and/or networks operating in accordance with existing WiGig Display Extension (WDE) protocols and/or future versions and/or derivatives thereof, devices and/or networks operating in accordance with existing WiGig Bus Extension (WBE) protocols and/or future versions and/or derivatives thereof, devices and/or networks operating in accordance with existing WiGig Secure Digital (SD) Extension (WSD) protocols and/or future versions and/or derivatives thereof, devices and/or networks operating in accordance with existing Bulk Only Transfer (BOT) Protocols and/or future versions and/or derivatives thereof, devices and/or networks operating in accordance with existing Wireless Fidelity (WiFi) Alliance (WFA) Peer-to-Peer (P2P) specifications and/or future versions and/or derivatives thereof, devices and/or networks operating in accordance with existing WiFi Serial Bus (WSB) specifications and/or future versions and/or derivatives thereof, devices and/or networks operating in accordance with existing IEEE 802.11 standards, and/or future versions and/or derivatives thereof, devices and/or networks operating in accordance with existing IEEE 802.16 standards and/or future versions and/or derivatives thereof, devices and/or networks operating in accordance with existing WirelessHD specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2 G, 2.5 G, 3 G, 3.5 G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In one or more example embodiments, a wireless device may be or may include a peripheral that is integrated with a computer, or a peripheral that is attached to a computer. In one or more example embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

One or more example embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

One or more example embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM). The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP. The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band. The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to device communication.

The phrase "Protocol Adaptation Layer (PAL)", as used herein, may include an abstraction layer configured to enable transporting traffic of at least one predefined protocol over a communication link. The predefined protocol may include, for example, a specific industry-standard protocol, e.g. USB, DisplayPort, and the like. The PAL may be above a layer of the communication link. For example, the PAL may be above a data link layer, for example, a MAC layer, and/or above a transport layer, e.g., a Transmission Control Protocol (TCP) or User Datagram Protocol (UDP), which is above the data link layer.

In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

One or more example embodiments are described herein with respect to a PAL connection over a wireless communication link, for example, a WiGig link or a WiFi link, e.g., as described below. However, other embodiments may include a PAL connection over any other wired or wireless communication link, e.g., an IP link.

The phrase "PAL communication unit", as used herein, may include a communication element to manage a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit. For example, a first PAL communication unit may communicate PAL traffic with a second PAL communication unit over a communication link. The PAL traffic may include traffic of a PAL connection, over a PAL, between first and second devices, e.g., a host device and a USB device.

In one or more example embodiments, the PAL communication unit (also referred to as "PAL manager" or "PAL controller") may perform the functionality of, may include, or may be implemented as part of a service set, for example, a WSE Service Set (WSS) or a Media-Agnostic (MA) USB Service Set (MASS). For example, the PAL communication unit may perform at least part of the functionality of a MA-USB device, a WSE device, a MA-USB host or a WSE host, e.g., as described below. In other embodiments, the PAL communication unit may perform the functionality of any other PAL device, element and/or module.

The phrases "MA-USB device" and "WSE device", as used herein, may include, for example, a MA-USB or WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/ any other technologies. For example, the integrated device may be presented through the MA-USB device or WSE device to a host as a USB device compliant with a USB specification, e.g., the USB 2.0, USB 3.0, USB 3.1 specification, or future versions thereof.

In one example, the MA-USB device may optionally include any computing platform, e.g., a portable device, which houses and/or performs the functionality of the MA-USB device and, optionally, one or more additional elements, e.g., drivers and/or application software, configured to perform the functionality of a peripheral device. In other embodiments, the MA-USB device may include and/or may be implemented by any other portable or non-portable device.

In one or more example embodiments, the MA-USB device may include USB device logic, e.g., for communicating with a USB device according to a USB Specification, a MA-USB device PAL, e.g., to control communication over the PAL, and a network interface, e.g., to communicate over the communication link. For example, the MA-USB device PAL may interface between the USB device logic and the network interface, e.g., in a transparent manner. In other embodiments, the MA-USB device may include any other elements. In one example, the PAL communication unit may perform the functionality of at least the MA-USB device PAL.

The phrases "MA-USB host" and "WSE host", as used herein, may include an architectural element of the MA-USB PAL or WSE PAL that includes a communication architecture, e.g., a WiGig or WiFi MAC and PHY, and USB host logic, e.g., as defined by a USB specification, e.g., the USB 2.0 , USB 3.0, or USB 3.1 specification or future versions thereof.

In one example, the MA-USB host or WSE host may optionally include any computing platform, e.g., a personal computer, which houses and/or performs the functionality of the MA-USB host or WSE host and, optionally, one or more additional elements, e.g., drivers and/or application software, configured to perform the functionality of a host device. In other embodiments, the MA-USB host or WSE host may include and/or may be implemented by any other portable or non-portable device.

In one or more example embodiments, the MA-USB host may include USB host logic, e.g., for communicating with a USB host according to a USB Specification, a MA-USB host PAL, e.g., to control communication over the PAL, and a network interface, e.g., to communicate over the communication link. For example, the MA-USB host PAL may interface between the USB host logic and the network interface, e.g., in a transparent manner. In other embodiments, the MA-USB host may include any other elements. In one example, the PAL communication unit may perform the functionality of at least the MA-USB host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a MA-USB device and the second device may include a MA-USB host. For example, the endpoint may belong to a USB device, e.g., a USB device, which may be integrated into the MA-USB device or connected, e.g., through a wired USB connection, to the MA-USB device, e.g., via a hub integrated into the MA-USB device. According to this example, the endpoint may be uniquely identified by the MA-USB host. For example, a combination of a MA-USB device address of the MA-USB device and a MA-USB EP handle assigned to the endpoint may uniquely identify a USB device endpoint within a MA-USB service set.

In other examples, the first and second devices may include any other, e.g., non-MA-USB, non-WSE and/or non-USB, device and the endpoint may perform the functionality of any other, e.g., non-USB, non-MA-USB and/or non-WSE, element.

Reference is now made to FIG. 1, which schematically illustrates a block diagram of a system 100, in accordance with one or more example embodiments. As shown in FIG. 1, in one or more example embodiments, system 100 may include a communication network including one or more communication devices, e.g., devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links, such as Thunderbolt® and Displayport®.

In one or more example embodiments, devices 102 and/or 104 may include, for example, a PC, a desktop computer, a mobile computer, a laptop computer, a notebook computer, a tablet computer, an Ultrabook™, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a smartphone, a tablet, a phablet, a television, a music player, or the like.

In one or more example embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Devices 102 and/or 104 may optionally include other suitable hardware components and/or software components. In one or more example embodiments, some or all of the components of one or more of devices 102 and/or 104 may be enclosed in a common housing or packaging, and may be interconnected or operably associated using one or more wired or wireless links. In other embodiments, components of one or more of communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by communication devices 102 and/or 104.

In one or more example embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In one or more example embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In one or more example embodiments, devices 102 and 104 may establish a communication link 103. Link 103 may be configured for communication over a data link layer, e.g., the MAC layer, a logical link control (LLC) and/or a transport layer. In one or more example embodiments, link 103 may include an uplink and/or a downlink. For example, the uplink may include a link for communicating data from device 104 to device 102, and/or the downlink may include a link for communicating data from device 102 to device 104.

In one example, the downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA. In one or more example embodiments, link 103 may include a wireless communication link, for example, a WiGig link, a WiFi link or a WLAN link, e.g., as described below.

In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network. In one or more example embodiments, devices 102 and 104 may form, or may be part of, a wireless communication network. The wireless communication network may include, for example, a P2P network or any other network. In one or more example embodiments, devices 102 and/or 104 may perform the functionality of DMG stations ("DMG STA"). For example, communication devices 102 and/or 104 may be configured to communicate over the DMG band. In one or more example embodiments, device 102 may include a mobile device and device 104 may include a docking device to connect device 102 to one or more other devices ("peripherals"), for example, including one or more USB devices, e.g., peripheral devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In one or more example embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB 1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB 2 interface supporting a data rate of 480 Mbps, and/or device 104 may be connected to one or more of devices 162, 164, 166 and/or 168 via a third USB interface 139 supporting a third data transfer rate, e.g., a USB 3.1 interface supporting a data transfer rate of up to 10 Giga bits per second (Gbps). Additionally, any and all of the devices discussed above may be connected via a common interface, for example, USB 3.1 or future versions thereof.

In one or more example embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 104 may include, or may be connected to, one or more USB ports, and each USB port may be connected to a USB device or be extended to several ports via USB hub 132 and/or USB hub 142.

In one or more example embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 140.

In one or more example embodiments, device 102 may include a PAL communication unit 130, and device 104 may include a PAL communication unit 131. PAL communication units 130 and 131 may be configured to manage a PAL connection between devices 102 and 104 over link 103. In one or more example embodiments, devices 102 and 104 may communicate over link 103 according to a WiGig protocol, a WiFi protocol, a WLAN protocol or any other wired or wireless protocol. In one or more example embodiments, devices 102 and 104 may be configured for communication of various dedicated services. For example, the WiGig technology is designed to carry multiple dedicated services, such as audio-visual (A/V) and input output (I/O). Device 102 may also include a USB interface (e.g., USBDI 137). Device 104 may also include a controller 141.

One or more example embodiments are described herein with reference to communicating a data stream including USB data over a wireless communication link according to a MA-USB or WSE protocol. However, other embodiments may be implemented with respect to communicating any other suitable data over any other communication link, according to any other communication protocol and/or over any other layer or PAL. In one or more example embodiments, device 102 may perform the functionality of a USB host and device 104 may perform the functionality of a USB device.

Figure 2:
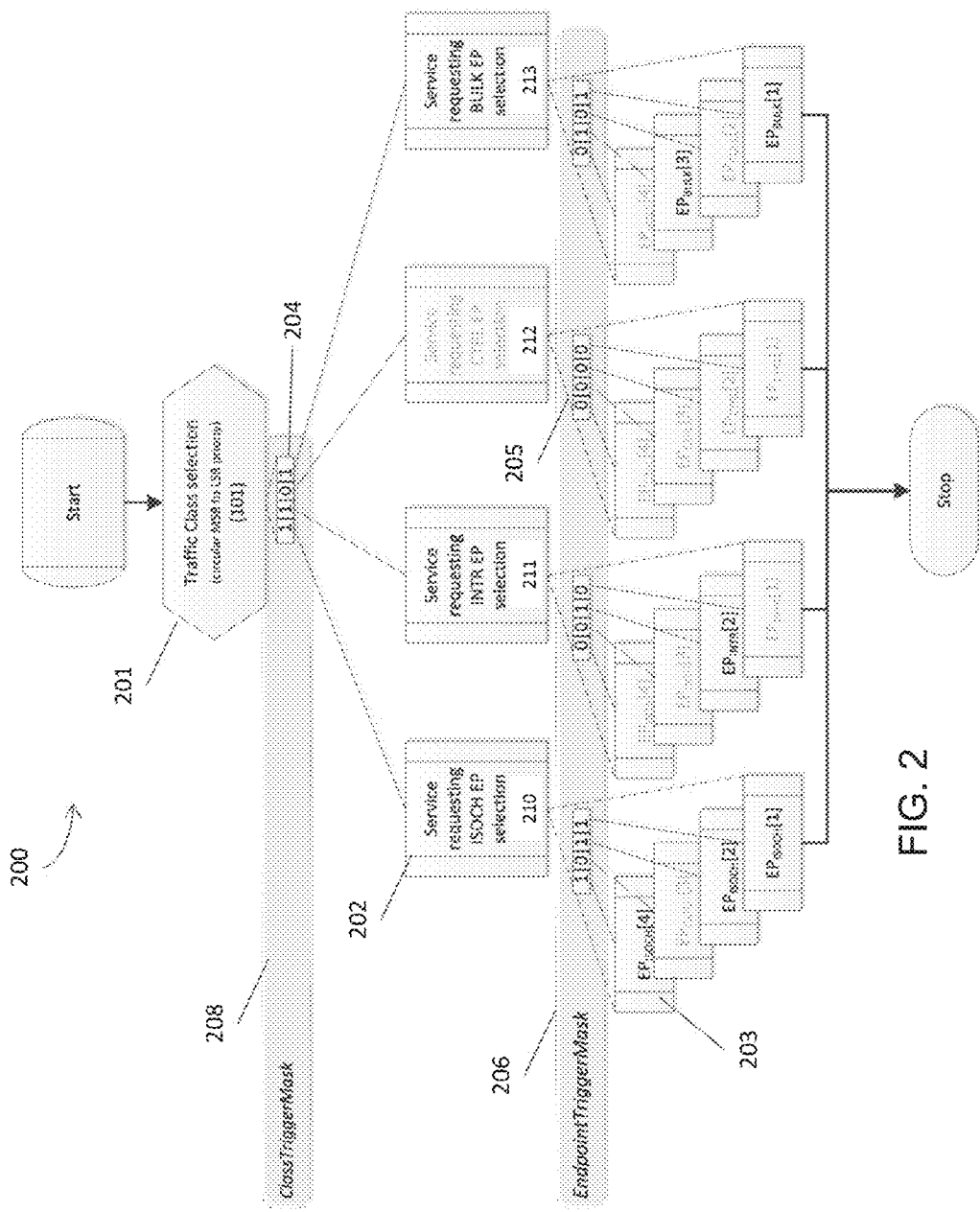
FIG. 2 illustrates example operations in a method for use in systems and devices, according to one or more example embodiments.

According to one or more example embodiments, the systems, methods and devices disclosed provide an efficient mechanism 200 to enable MA-USB PAL to decide on which traffic class, ISOCH, INTR, CTRL or BULK, and which USB endpoint (USB EP), or a queue associated with which USB EP, to service at any given instance without the need to use locking mechanism to determine the scheduling. Example systems, methods, and devices also allow efficient implementation on CPUs that provide native support for atomic bit test or compare or exchange or set, and clear operations like Intel® (REX) LOCK BTS and (REX) LOCK CMPXCHG8B or CMPXCHG16B, for example. Turning now to FIG. 2, EndpointTriggerMask 206 may be defined as a bitmask that may hold binary information 205 about the state of each USB Endpoint 202 queue in the system. The state of a queue 203 may be represented by respective bit which may be set to 1 for a queue that may require service or cleared to 0 for a queue that doesn't require servicing. According to one or more example embodiments, ClassTriggerMask 208 may be defined as a bitmask that may hold binary information 204 about the aggregated state of each USB traffic class 201. The state of USB traffic class 201 may be represented by respective bit which may be set to 1 for a class that has at least one EP queue that requires service or cleared to 0 for a class that has no EP queue that requires servicing. FIG. 2, for example, illustrates a demonstrative flow executed by MA-USB PAL scheduler in order to decide which request from which class shall be processed, for example. The scheduling decisions 101 may be made by a conditional branch CPU instruction to find which class to service first, for example. After the class to be serviced has been determined, for example, the next operations 210, 211, 212, 213 may be carried out to select one or more USB Endpoints that require service by using atomic compare and exchange CPU instruction on a EndpointTriggerMask followed by bit shift and conditional branch, for example. The advantage of representing set of USB Endpoint queues 203 as bit field makes the operation on their state efficient to implement in both hardware and software. Such representation when combined with natively supported atomic operations on bit fields that may be ubiquitous in CPUs may lead to high throughput lockless implementation of USB traffic class scheduling by MA-USB PALs, for example.

Figure 4:
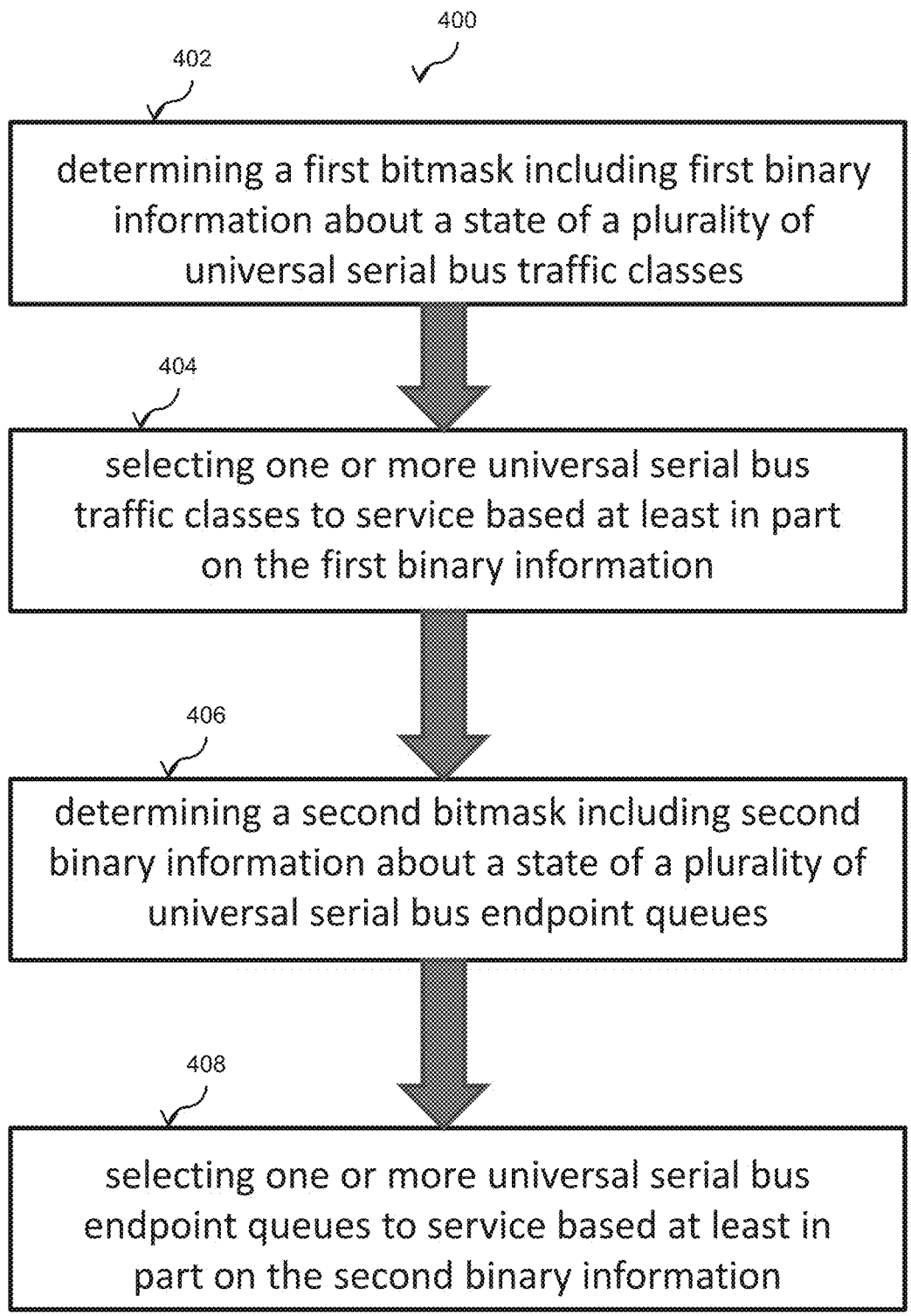
FIG. 4 illustrates example operations in a method for use in systems and devices, according to one or more example embodiments.

Reference is made to FIG. 4, which schematically illustrates a method of lockless implementation of USB traffic class scheduling by a MA-USB PAL, in accordance with one or more example embodiments. In some embodiments, one or more of the operations of the method of FIG. 4 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a MA-USB host and/or a MA-USB device.

As indicated at block 402, the method may include a method for scheduling traffic by a media agnostic universal serial bus protocol adaptive layer. The method includes determining, by a processor, a first bitmask including first binary information about a state of a plurality of universal serial bus traffic classes, e.g., as described above.

As indicated at block 404, the method may include selecting, by the processor, one or more universal serial bus traffic classes to service based at least in part on the first binary information, e.g., as described above.

As indicated at block 406, the method may include determining, by the processor, a second bitmask including second binary information about a state of a plurality of universal serial bus endpoint queues, each universal serial bus endpoint queue including a plurality of universal serial bus endpoints, e.g., as described above.

As indicated at block 408, the method may include selecting, by the processor, one or more universal serial bus endpoint queues to service based at least in part on the second binary information, e.g., as described above.

According to one or more example embodiments, the state of a universal serial bus traffic class may be represented by a respective bit where the respective bit may be set to 1 for a class that has at least one endpoint queue that requires service or cleared to 0 for a class that has no endpoint queue that requires service. Selecting one or more universal serial bus endpoints to service may be executed by an atomic compare and exchange CPU instruction followed by bit shift and conditional branch. The state of a universal serial bus endpoint queue may be represented by respective bits, where the respective bit may be set to 1 for a queue that requires service or cleared to 0 for a queue that does not require service. Selecting one or more universal serial bus endpoints to service may be executed by a conditional branch CPU instruction.

Figure 3:
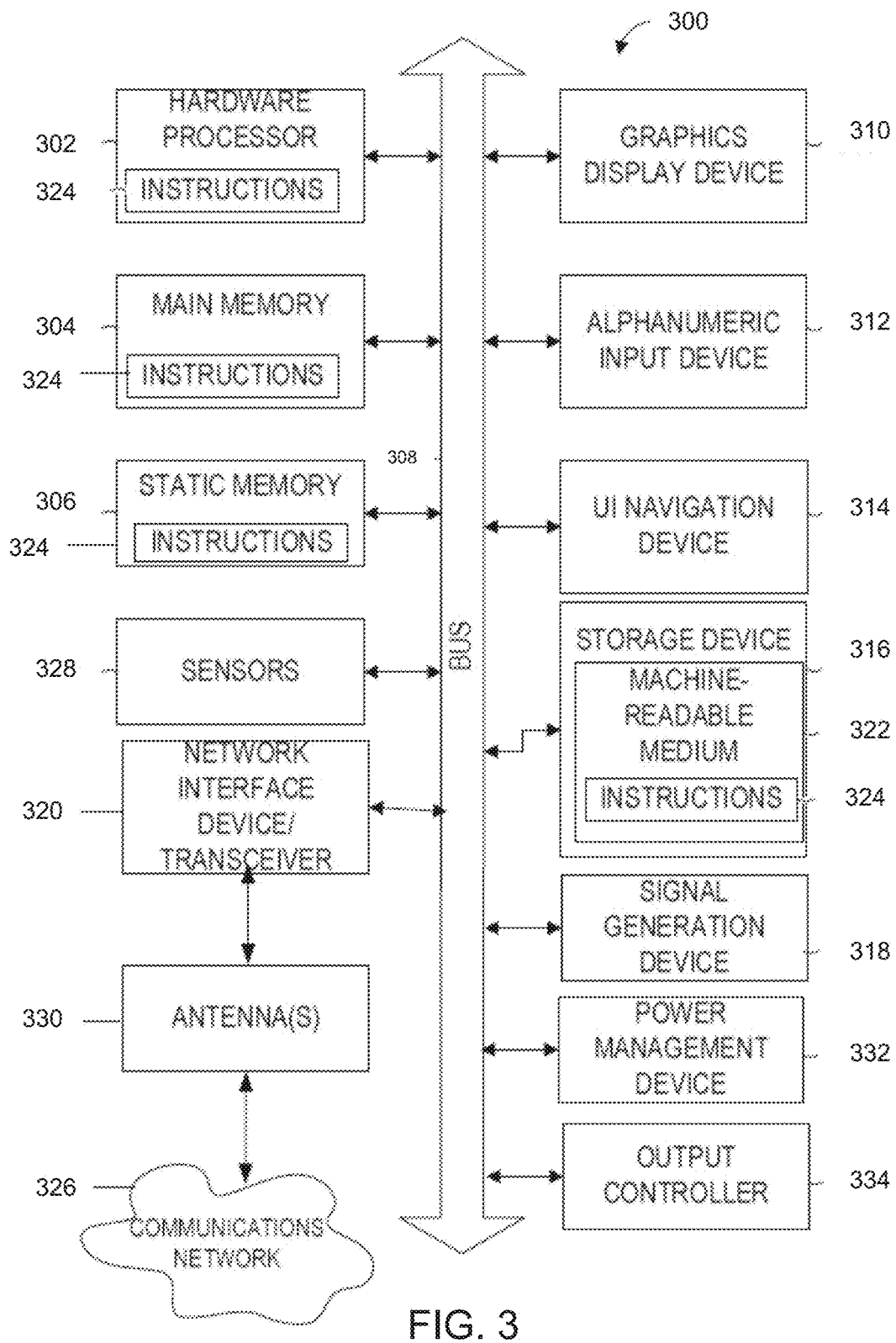
FIG. 3 shows a block diagram of an example of a machine upon which any of one or more techniques (e.g., methods) according to one or more embodiments discussed herein may be performed.

FIG. 3 illustrates a block diagram of an example machine 300 or system upon which any one or more of the techniques (e.g., methodologies) discussed herein may be performed. In other embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a power management device 332, a graphics display device 310, an alphanumeric input device 312 (e.g., a keyboard), and a user interface (UI) navigation device 314 (e.g., a mouse). In an example, the graphics display device 310, alphanumeric input device 312 and UI navigation device 314 may be a touch screen display. The machine 300 may additionally include a storage device (i.e., drive unit) 316, a signal generation device 318 (e.g., a speaker), a network interface device/transceiver 320 coupled to antenna(s) 330, and one or more sensors 328, such as a global positioning system (GPS) sensor, compass, accelerometer, or other sensor. The machine 300 may include an output controller 334, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within the static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device/transceiver 320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 320 may include one or more physical jacks (e.g., Ethernet, coaxial, or phone jacks) or one or more antennas to connect to the communications network 326. In an example, the network interface device/transceiver 320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 300, and includes digital or analog communications signals or other intangible media to facilitate communication of such software.

In one embodiment, FIG. 3 illustrates a functional block diagram of a communication device that may be suitable for use as a user terminal or communication device 102, 104, as illustrated in FIG. 1, for example. The communication device 300 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication device 300 may include physical layer circuitry having a network interface device/transceiver 320 for transmitting and receiving signals to and from other communication devices using one or more antennas 330. The physical layer circuitry may also include medium access control (MAC) circuitry for controlling access to the wireless medium. The communication device 300 may also include hardware processor 302, main memory 304, static memory 306, and storage device 316 arranged to perform the operations described herein. In some embodiments, the physical layer circuitry and the hardware processor 302 may be configured to perform the operations detailed in FIG. 2, for example.

In accordance with some embodiments, the MAC circuitry may be arranged for a wireless medium and configured for frames or packets for communicating over the wireless medium and the physical layer circuitry may be arranged to transmit and receive signals. The physical layer circuitry may include circuitry for modulation/demodulation, upconversion/downconversion, filtering, amplification, etc. In some embodiments, the processing circuitry of the communication device 300 may include one or more processors (e.g., hardware processor 302). In other embodiments, two or more antennas 330 may be coupled to the physical layer circuitry arranged for sending and receiving signals. The memory 304, 306, 316 may store information for configuring the processing circuitry 302 to perform operations for configuring and transmitting message frames and performing the various operations described herein. The main memory 304, static memory 306, and the storage device 316 may include any type of memory, including non-transitory memory, for storing information in a form readable by a machine (e.g., a computer). For example, the memory 304 may include a computer-readable storage device, read-only memory (ROM), random-access memory (RAM), magnetic disk storage media, optical storage media, flash-memory devices and other storage devices and media.

In some embodiments, the communication device 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 300 may include one or more antennas 330. The antennas 330 may include one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 300 may include one or more of a keyboard, a display, a non-volatile memory port, multiple antennas, a graphics processor, an application processor, speakers, and other mobile device elements. The display may be an LCD screen including a touch screen.

Although the communication device 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 300 may refer to one or more processes operating on one or more processing elements.

Certain embodiments may be implemented in one or a combination of hardware, firmware and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 300 may include one or more processors and may be configured with instructions stored on a computer-readable storage device memory.

Example Embodiments

One example embodiment may be a method for scheduling traffic by a media agnostic universal serial bus protocol adaptive layer. The method includes determining, by a processor, a first bitmask including first binary information about a state of a plurality of universal serial bus traffic classes, selecting, by the processor, one or more universal serial bus traffic classes to service based at least in part on the first binary information, determining, by the processor, a second bitmask including second binary information about a state of a plurality of universal serial bus endpoint queues, each universal serial bus endpoint queue including a plurality of universal serial bus endpoints, and selecting, by the processor, one or more universal serial bus endpoint queues to service based at least in part on the second binary information. The state of a universal serial bus traffic class may be represented by a respective bit where the respective bit may be set to 1 for a class that has at least one endpoint queue that requires service or cleared to 0 for a class that has no endpoint queue that requires service. Selecting one or more universal serial bus endpoints to service may be executed by an atomic compare and exchange CPU instruction followed by bit shift and conditional branch. The state of a universal serial bus endpoint queue may be represented by respective bits, where the respective bit may be set to 1 for a queue that requires service or cleared to 0 for a queue that does not require service. Selecting one or more universal serial bus endpoints to service may be executed by a conditional branch CPU instruction.

Another example embodiment is a computing device for scheduling traffic, the device including physical layer circuitry, one or more antennas, at least one memory, and one or more processing elements for determining a first bitmask including first binary information about a state of a plurality of universal serial bus traffic classes, selecting one or more universal serial bus traffic classes to service based at least in part on the first binary information, determining a second bitmask including second binary information about a state of a plurality of universal serial bus endpoint queues, each universal serial bus endpoint queue including a plurality of universal serial bus endpoints, and selecting one or more universal serial bus endpoint queues to service based at least in part on the second binary information. The state of a universal serial bus traffic class may be represented by a respective bit where the respective bit may be set to 1 for a class that has at least one endpoint queue that requires service or cleared to 0 for a class that has no endpoint queue that requires service. Selecting one or more universal serial bus endpoints to service may be executed by an atomic compare and exchange CPU instruction followed by bit shift and conditional branch. The state of a universal serial bus endpoint queue may be represented by respective bits, where the respective bit may be set to 1 for a queue that requires service or cleared to 0 for a queue that does not require service. Selecting one or more universal serial bus endpoints to service may be executed by a conditional branch CPU instruction.

Another example embodiment is a non-transitory computer readable storage device including instructions stored thereon, which when executed by one or more processor(s)

of a computing device, cause the computing device to perform operations of determining a first bitmask including first binary information about a state of a plurality of universal serial bus traffic classes, selecting one or more universal serial bus traffic classes to service based at least in part on the first binary information, determining a second bitmask including second binary information about a state of a plurality of universal serial bus endpoint queues, each universal serial bus endpoint queue including a plurality of universal serial bus endpoints, and selecting one or more universal serial bus endpoint queues to service based at least in part on the second binary information. The state of a universal serial bus traffic class may be represented by a respective bit where the respective bit may be set to 1 for a class that has at least one endpoint queue that requires service or cleared to 0 for a class that has no endpoint queue that requires service. Selecting one or more universal serial bus endpoints to service may be executed by an atomic compare and exchange CPU instruction followed by bit shift and conditional branch. The state of a universal serial bus endpoint queue may be represented by respective bits, where the respective bit may be set to 1 for a queue that requires service or cleared to 0 for a queue that does not require service. Selecting one or more universal serial bus endpoints to service may be executed by a conditional branch CPU instruction.

Another example embodiment is a system including one or more computing devices for performing scheduling, the one or more computing devices including physical layer circuitry, one or more antennas, at least one memory, and one or more processing elements for determining a first bitmask including first binary information about a state of a plurality of universal serial bus traffic classes, selecting one or more universal serial bus traffic classes to service based at least in part on the first binary information, determining a second bitmask including second binary information about a state of a plurality of universal serial bus endpoint queues, each universal serial bus endpoint queue including a plurality of universal serial bus endpoints, and selecting one or more universal serial bus endpoint queues to service based at least in part on the second binary information. The state of a universal serial bus traffic class may be represented by a respective bit where the respective bit may be set to 1 for a class that has at least one endpoint queue that requires service or cleared to 0 for a class that has no endpoint queue that requires service. Selecting one or more universal serial bus endpoints to service may be executed by an atomic compare and exchange CPU instruction followed by bit shift and conditional branch. The state of a universal serial bus endpoint queue may be represented by respective bits, where the respective bit may be set to 1 for a queue that requires service or cleared to 0 for a queue that does not require service. Selecting one or more universal serial bus endpoints to service may be executed by a conditional branch CPU instruction.

The above description and accompanying drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the above description. Further embodiments, features, and aspects will become apparent from the description, the drawings, and the claims. Embodiments set forth in the claims encompass all available equivalents of those claims.

While there have been shown, described and pointed out, fundamental novel features of the disclosure as applied to the exemplary embodiments thereof, it will be understood that various omissions and substitutions and changes in the form and details of devices illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A method comprising:
    determining, by a processor, a first bitmask comprising first binary information about a state of a plurality of universal serial bus traffic classes;
    selecting, by the processor, one or more universal serial bus traffic classes to service based at least in part on the first binary information, wherein selecting the one or more universal serial bus traffic classes to service comprises executing a conditional branch central processing unit (CPU) instruction;
    determining, by the processor, a second bitmask comprising second binary information about a state of a plurality of universal serial bus endpoint queues, each universal serial bus endpoint queue associated with a plurality of universal serial bus endpoints; and
    selecting, by the processor, one or more universal serial bus endpoint queues to service based at least in part on the first binary information and the second binary information.

2. The method of claim 1, wherein the state of a universal serial bus traffic class is represented by a respective bit.

3. The method of claim 2, wherein the respective bit is set to 1 for a class that has at least one endpoint queue that requires service or cleared to 0 for a class that has no endpoint queue that requires service.

4. The method of claim 1, wherein the state of a universal serial bus endpoint queue is represented by a respective bit.

5. The method of claim 4, wherein the respective bit is set to 1 for a queue that requires service or cleared to 0 for a queue that does not require service.

6. The method of claim 5, wherein selecting one or more universal serial bus endpoints to service further comprises executing an atomic compare and exchange CPU instruction followed by a bit shift and conditional branch.

7. A computing device comprising:
    at least one memory comprising computer-executable instructions stored thereon; and
    one or more processing elements to execute the computer-executable instructions for:
        determining a first bitmask comprising first binary information about a state of a plurality of universal serial bus traffic classes;
        selecting one or more universal serial bus traffic classes to service based at least in part on the first binary information, wherein selecting the one or more universal serial bus traffic classes to service comprises executing a conditional branch CPU instruction;

determining a second bitmask comprising second binary information about a state of a plurality of universal serial bus endpoint queues, each universal serial bus endpoint queue associated with a plurality of universal serial bus endpoints; and selecting one or more universal serial bus endpoint queues to service based at least in part on the first binary information and the second binary information.

8. The device of claim 7, wherein the state of a universal serial bus traffic class is represented by a respective bit.

9. The device of claim 8, wherein the respective bit is set to 1 for a class that has at least one endpoint queue that requires service or cleared to 0 for a class that has no endpoint queue that requires service.

10. The device of claim 7, wherein the state of a universal serial bus endpoint queue is represented by a respective bit.

11. The device of claim 10, wherein the respective bit is set to 1 for a queue that requires service or cleared to 0 for a queue that does not require service.

12. The device of claim 11, wherein selecting one or more universal serial bus endpoints to service further comprises executing an atomic compare and exchange CPU instruction followed by a bit shift and conditional branch.

13. A non-transitory computer readable storage device including instructions stored thereon, which when executed by one or more processor(s) of a computing device, cause the computing device to perform operations of:

determining a first bitmask comprising first binary information about a state of a plurality of universal serial bus traffic classes;

selecting one or more universal serial bus traffic classes to service based at least in part on the first binary information, wherein selecting the one or more universal serial bus traffic classes to service comprises executing a conditional branch CPU instruction;

determining a second bitmask comprising second binary information about a state of a plurality of universal serial bus endpoint queues, each universal serial bus endpoint queue associated with a plurality of universal serial bus endpoints; and selecting one or more universal serial bus endpoint queues to service based at least in part on the first binary information and the second binary information.

14. The device of claim 13, wherein the state of a universal serial bus traffic class is represented by a respective bit.

15. The device of claim 14, wherein the respective bit is set to 1 for a class that has at least one endpoint queue that requires service or cleared to 0 for a class that has no endpoint queue that requires service.

16. The device of claim 13, wherein the state of a universal serial bus endpoint queue is represented by a respective bit.

17. The device of claim 16, wherein the respective bit is set to 1 for a queue that requires service or cleared to 0 for a queue that does not require service.

18. The device of claim 17, wherein selecting one or more universal serial bus endpoints to service further comprises executing an atomic compare and exchange CPU instruction followed by a bit shift and conditional branch.

19. A system comprising:
one or more computing devices comprising:
a physical layer circuitry,
one or more antennas,
at least one memory, and
one or more processing elements for:
determining a first bitmask comprising first binary information about a state of a plurality of universal serial bus traffic classes;
selecting one or more universal serial bus traffic classes to service based at least in part on the first binary information, wherein selecting the one or more universal serial bus traffic classes to service comprises executing a conditional branch CPU instruction;
determining a second bitmask comprising second binary information about a state of a plurality of universal serial bus endpoint queues, each universal serial bus endpoint queue associated with a plurality of universal serial bus endpoints; and
selecting one or more universal serial bus endpoint queues to service based at least in part on the first binary information and the second binary information.

20. The system of claim 19, wherein the state of a universal serial bus traffic class is represented by a respective bit.

21. The system of claim 20, wherein the respective bit is set to 1 for a class that has at least one endpoint queue that requires service or cleared to 0 for a class that has no endpoint queue that requires service.

22. The system of claim 19, wherein the state of a universal serial bus endpoint queue is represented by a respective bit.

23. The system of claim 22, wherein the respective bit is set to 1 for a queue that requires service or cleared to 0 for a queue that does not require service.

24. The system of claim 23, wherein selecting one or more universal serial bus endpoints to service further comprises selecting an atomic compare and exchange CPU instruction followed by a bit shift and conditional branch.

* * * * *